(12) United States Patent
Ederer et al.

(10) Patent No.: US 8,005,982 B2
(45) Date of Patent: Aug. 23, 2011

(54) DATA STORAGE METHOD AND SYSTEM

(75) Inventors: Werner Ederer, Schoenaich (DE);
Benno Staebler, Holzgerlingen (DE);
Steffen Koenig, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 11/456,704

(22) Filed: Jul. 11, 2006

(65) Prior Publication Data

US 2007/0133554 A1 Jun. 14, 2007

(30) Foreign Application Priority Data

Dec. 7, 2005 (EP) .................................. 05106357

(51) Int. Cl.
*G06F 15/173* (2006.01)
*G06F 15/16* (2006.01)
*G06F 15/177* (2006.01)

(52) U.S. Cl. ........ 709/238; 709/244; 709/230; 709/220; 709/226

(58) Field of Classification Search .................. 709/220, 709/226, 229, 227, 230–232, 238–244; 707/622
See application file for complete search history.

(56) References Cited

U.S. PATENT DOCUMENTS

| | | | | |
|---|---|---|---|---|
| 6,446,068 | B1 * | 9/2002 | Kortge | 1/1 |
| 7,209,973 | B2 * | 4/2007 | Tormasov et al. | 709/231 |
| 7,394,817 | B2 * | 7/2008 | Yap | 370/400 |
| 7,650,529 | B2 * | 1/2010 | Fan et al. | 714/4 |
| 2002/0147815 | A1 * | 10/2002 | Tormasov et al. | 709/226 |
| 2005/0086210 | A1 * | 4/2005 | Kita et al. | 707/3 |
| 2007/0192349 | A1 * | 8/2007 | Farr et al. | 707/102 |

OTHER PUBLICATIONS

Bozkaya, Distance-based indexing for high-dimensional metric spaces, International Conference on Management of Data, Proceedings of the 1997 ACM SIGMOD international conference on Management of data, p. 357-368, 1997, ISBN-0-89791-911-4.*

* cited by examiner

*Primary Examiner* — David Lazaro
*Assistant Examiner* — Edward J Kim
(74) *Attorney, Agent, or Firm* — Matthew W. Baca

(57) ABSTRACT

A method and computer system is provided for storing a data file in a peer-to-peer network of computer systems according to a selectable service level. Each computer system offers storage services at one of a set of service levels, the method comprising assigning to each of the computer systems respective peer identifiers from a metric space in such a way that the distance between peer identifiers of computer systems offering storage at the same service level is smaller than between peer identifiers of computer systems offering storage at different service levels.

18 Claims, 4 Drawing Sheets

DATA STORAGE METHOD AND SYSTEM

FIELD OF THE INVENTION

The present invention relates to the field of computer systems and methods, and more particularly without limitation to the field of data storage.

BACKGROUND AND PRIOR ART

Almost every company in the world faces the challenge of storing, retrieving and managing data in a cost-effective way with the appropriate levels of security, availability and response time. While for a variety of data, large databases are the only meaningful technology, for a significant set of data the idea of leveraging unused storage space available on clients and servers within the company seems appealing. First attempts have been made in scenarios where computer systems are connected to centrally co-ordinated computational grids, such as in the Large Hadron Collider project at CERN.

On the Internet, radically decentralized peer-to-peer architectures gained prominence through their use for file sharing applications such as the Gnutella system. Today, a large set of algorithms and programs are available for splitting, storing, and retrieving data in peer-to-peer networks, and it seems attractive to use these technologies within large companies to store and retrieve data using the available storage space on existing servers or clients in a cost-effective manner.

Among the algorithms available are Chord/DHash (http://pdos.csail.mit.edu/papers/chord:sigcomm01/chord_sigcomm.pdf), CAN (http://www.icir.org/sylvia/thesis.ps), Pastry (http://www.cs.rice.edu/~druschel/publications/Pastry.pdf), Tapestry (http://www.cs.berkeley.edu/~ravenben/publications/CSD-01-1141.pdf), and Kademlia (http://www.cs.rice.edu/ Conferences/IPTPS02/109.pdf).

A common trait of all peer-to-peer networks implemented by the mentioned algorithms is to assign to every computer system in the network a unique peer identifier from an address space, and to assign to every data object stored in the network a unique data identifier from the same address space. The address space is a metric space, a set where a notion of distance between elements of the set is defined. The topology of the address space and the way the distance is calculated vary between the available algorithms. For each data object the peer having the identifier with the smallest distance to the data object's data identifier is chosen as storage location. The peer identifiers are usually constructed as values of a hash function such as SHA-1, taking arbitrary unique properties such as the IP or MAC address of the peer computer system as input. The data identifiers of data objects are correspondingly calculated as values of the hash function, taking unique properties of the data object such as its binary contents as input.

In a peer-to-peer network realized by one of the algorithms mentioned above, stored data objects are retrieved by comparing bit-by-bit the data identifier of the data object searched for to the peer identifier of one of the peer computer systems. If the peer computer system does not possess a copy of the data object searched for but has knowledge of a further peer computer system with a peer identifier that is closer to the data identifier searched for than its own peer identifier, the query for the data object is passed on to the further peer computer system. This is repeated until the query reaches a peer computer system that possesses a copy of the data object, and the data object is retrieved.

To guard against loss of data objects in the case of failure of one or more peer computer systems, most peer-to-peer algorithms store data objects redundantly. In the simplest approach, a predetermined number of copies of each data object are stored. In some cases, so-called information dispersal algorithms are used that aim at balancing resource usage and achieved safety benefit.

Microsoft Research's Farsite (http://research.microsoft.com/research/sn/Farsite/OSDI2002.pdf) is a secure, scalable file system that logically functions as a centralised file server but is physically distributed among a set of untrusted computers. Farsite provides file availability and reliability through randomised replicated storage; it ensures the secrecy of file contents with cryptographic techniques; it maintains the integrity of file and directory data with a Byzantine-fault-tolerant protocol; it is designed to be scalable by using a distributed hint mechanism and delegation certificates for pathname translations; and it achieves performance by locally caching file data, lazily propagating file updates, and varying the duration and granularity of content leases.

HiveCache (http://www.wtc-sf.org/IT%20Venture%20Series%20Companies.html, http://www.hivecache.com/) provides peer-to-peer distributed storage technology that aggregates the unused storage on enterprise PCs into a shared network, in order to deliver low-cost, reliable, secure storage to enterprises. HiveCache's storage mesh provides disk-based backup/restore services to desktop and laptop PCs within the enterprise, which enable users to restore their own files without needing to call in IT staff assistance and providing IT staff with a backup tool that has almost no management overhead, using policy-based decision-making by the desktop agents to maintain the storage network. These solutions use distributed resource allocation mechanisms, reputation tools, and secure distributed storage technology developed by the company and described in US patent application 20010037311.

The Distributed Internet Backup System (http://www.csua.berkeley.edu/~emin/source_code/dibs) enables to perform incremental back-ups of files to peers and in return store their files. It includes a peer finder service to allow finding peers to exchange backup space with. The Distributed Internet Backup System encrypts all data transmissions so that the peers files are traded with cannot access the backed-up data.

SUMMARY OF THE INVENTION

In accordance with the present invention there is provided a method of storing a data file from a user computer system in a peer-to-peer network of computer systems. Each computer system offers storage services at a respective offered service level of a set of service levels. The method comprises assigning to each of the computer systems respective peer identifiers from a metric space in such a way that the distance between peer identifiers of computer systems offering storage at the same service level is smaller than between peer identifiers of computer systems offering storage at different service levels.

The method further comprises selecting a desired service level of the set of service levels for storing the data file. One or more data objects are produced from the data file, assigning to one of the data objects a data identifier from the metric space in such a way that the distance between the data identifier of the one of the data objects and any peer identifier of a computer system offering storage at the desired service level is smaller than the distance between the data identifier of the one of the data objects and any peer identifier of a computer system offering storage at a service level different from the desired service level. The one of the data objects is then routed through the peer-to-peer network to a replication computer system having a peer identifier that is closer to the data identifier of the one of the data objects than any peer identifier of another computer system connected to the replication computer system through peer-to-peer interactions. The one of the data objects is then stored on the replication computer system.

The present invention is particularly advantageous because it enables storing a data file in a peer-to-peer network according to defined and differentiated service levels. While existing peer-to-peer networks can offer much more efficient ways for archiving, backup, and restore of data than conventional, centralised client-server solutions, by merit of the present invention peer-to-peer networks gain a capability that is prerequisite for their use as a commercial storage solution—the management of agreements on a defined service level. In an enterprise, each type of data to be stored has goals, for example for availability, response time or security. The present invention ensures that storing and retrieving of data happens in the context of these goals.

In accordance with an embodiment of the invention, the method comprises encrypting the one of the data objects. This brings the additional advantage that a user of the replication computer system, where the one of the data objects is stored, is prevented from reading or otherwise extracting meaningful information from the one of the data objects. Furthermore, encrypting the one of the data objects ensures that the data object will not be intercepted and compromised during its travel through the peer-to-peer network. As a result, confidential data that must not be disclosed can be safely stored in the peer-to-peer network.

In accordance with an embodiment, for each of the computer systems in the peer-to-peer network the respective peer identifier comprises a concatenation of a hash value derived from the service level offered by the respective computer system and a hash value derived from unique properties of the respective computer system. For example, the peer identifier can be constructed by operating a hash function on a string of characters identifying in a defined way the service level offered by the computer system, and concatenating the result with the further result of operating the same-or a different-hash function on a string of characters constructed in a defined way from unique properties of the computer system such as its IP or other network address, its CPU identifier, or its MAC address. If the metric in the address space of the peer identifiers is defined in a suitable way, for example as bit-by-bit comparison of two peer identifiers, assigning highest significance to the bits at the beginning of the respective peer identifiers, the distance between peer identifiers of computer systems offering storage at the same service level consequently is smaller than between peer identifiers of computer systems offering storage at different service levels.

In accordance with an embodiment, the data identifier of the one of the data objects comprises a concatenation of a hash value derived from the desired service level and a hash value derived from the one of the data objects. For example, the data identifier can be constructed by operating a hash function on a string of characters identifying the desired service level according to which the data object is desired to be stored to create a first hash value, and concatenating the result with the further result of operating the same-or a different-hash function on the binary contents, the name, or a string representing otherwise defined properties of the data object to create a second hash value. If the desired service level of the data object is expressed in the same defined way as the offered service levels of each of the computer systems in the peer-to-peer network, and the same hash function is used for operating on them, with a metric as described in the above paragraph the distance between the data identifier of a data object and the peer identifier of a computer system serves to distinguish matching and non-matching pairs of desired and offered service levels: For any matching pair, the distance between the data and peer identifiers is smaller than for any non-matching pair.

In accordance with an embodiment, the method further comprises assessing the service level offered by each of the computer systems, the assessment being based on any of available disk space, overall disk space, uptime, and networking bandwidth of the respective computer system. By assessing the service level of each of the computer system in a standardised, objective way, offered service levels are guaranteed to be comparable across the peer-to-peer network. This embodiment is particularly advantageous because parameters such as available disk space or networking bandwidth cannot be assumed to be constant in time. By re-evaluating the service level offered, for example at regular intervals, the values of the service level can be updated to correctly reflect the actual situation.

One advantage of a storage solution based on a peer-to-peer network is that it allows leveraging unused disk capacity on client work stations, servers and even storage systems that is already paid for. Even if this disk capacity seems to come for free, there are in fact costs that need to be managed. One example is network cost, which in badly managed peer-to-peer networks can grow rapidly. In accordance with an embodiment, the method further comprises allotting payment units to each of the computer systems according to the service level offered by the respective computer system. This embodiment is particularly advantageous because it provides an incentive to the user of each participating computer system to contribute resources to the peer-to-peer network. By increasing system uptime, providing a larger hard disk or a higher-bandwidth network connection the user can improve the service level offered by his computer system and in return be awarded with a higher amount of payment units.

In accordance with an embodiment, payment units are transferred from the user computer system to the replication computer system in exchange for storing the one of the data objects. By requiring the user to pay with earned payment units for using storage on other computer systems, an incentive is provided to make restrained use of the storage provided by the peer-to-peer network and shared with all other users. If a user needs more storage than he has payment units available, he is motivated to increase his own contributions to the network to be allotted more payment units, and thereby increase the overall capacity of the peer-to-peer network. Alternatively, he has the option to cancel some of the data objects stored for him on other computer systems.

In accordance with an embodiment, the payment units transferred to the replication computer system depend on the desired service level selected for the data file. This is of particular advantage because for example a user facing a dearth of payment units obtains a further option besides cancelling storage of less important data objects and contributing more resources to earn more payment units. Instead, the desired service level for all or some of his data objects can be adjusted to another, lower-priced service level.

In accordance with an embodiment, the method further comprises evaluating the actual service level at which the one of the data objects is stored on the replication computer system, and routing the one of the data objects to a further replication computer system if the actual service level does not match the desired service level. This embodiment is of particular advantage because the storage location of data objects is adjusted dynamically according to changes in either the offered service level of the replication system, or in the desired service level for the one of the data objects. For example, the evaluation can be initiated automatically at regular intervals by the replication computer system, in order to evaluate the service level of the data objects stored on the replication computer system. Alternatively, the evaluation can be initiated by the user for whom the one of the data objects was stored on the replication system, which is of particular advantage because the evaluation can detect a complete unavailability of the replication computer system and lead to storing of a copy of the one of the data objects on a further computer system.

In accordance with an embodiment, the number of data objects produced from the data file depends on the desired service level selected for the data file. To improve the performance of storing and retrieval operations, especially involving computer systems having a low-bandwidth network connection, it is expedient to split the data file to be stored into a greater number of data objects of correspondingly small size that are distributed to a corresponding number of replication computer systems. Because the higher performance comes with higher network cost, it is advantageous to stipulate the number of data objects according to the desired service level. The steps of assigning, routing, and storing are repeated for each of data objects produced from the data file.

In accordance with an embodiment, the method further comprises retrieving a subset of the one or more data objects from a subset of the one or more replication computer systems, and restoring the data file using the subset of the one or more of the data objects. To improve the resilience against failure of one or more peer computer systems, it is expedient to store data objects redundantly. If some of the data objects cannot be retrieved, it then still is possible to reassemble the data file from the subset of data objects that could be retrieved. In the simplest approach, each data object is stored in a predetermined number of copies. More sophisticated algorithms are available that achieve superior balancing of resource usage and achieved safety benefit. Because the higher safety benefit comes with higher network cost, it is advantageous to stipulate the number of data objects according to the desired service level.

BRIEF DESCRIPTION OF THE DRAWINGS

In the following preferred embodiments of the invention will be described in greater detail by way of example only making reference to the drawings in which.

DETAILED DESCRIPTION

Figure 1:
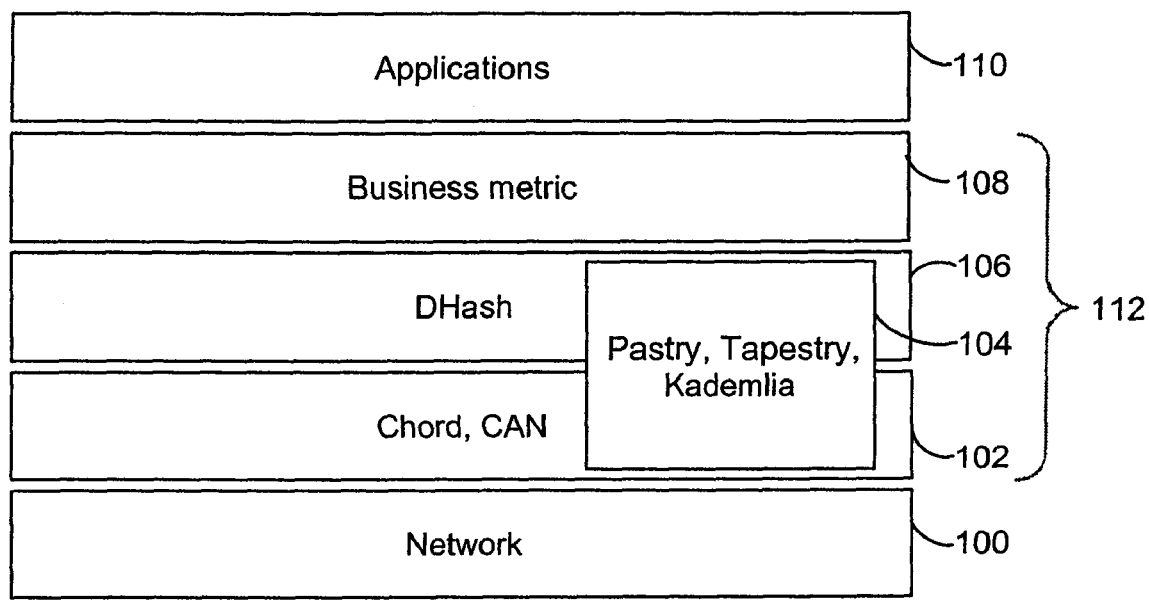
FIG. 1 is a layer diagram of a service-level based peer-to-peer network architecture.

FIG. 1 is a layer diagram depicting a network architecture as a series of layers, each layer having the property that it only uses the functions of the layer below and only exports functionality to the layer above. The network layer 100, the lowest layer in the diagram, represents a conventional computer network providing transparent transport of data between computer systems. The Internet and corporate networks based on the TCP/IP protocol are examples of such conventional networks. This architecture therefore enables implementing the present invention on the foundation of already existing network infrastructure.

An applications layer 110 forms the topmost layer of the diagram from where it interfaces directly to and performs common application services for application processes, in particular the service of storing and retrieving of a data file according to a selectable service level defined by parameters such as availability, security, and retrieval time of the stored data file. The application layer 110 builds on the functionality of a business metric layer 108 immediately below-a layer that provides routing of data to and from storage locations across the network according to a specified service level. The business metric layer 108 performs its routing tasks independently of the topology of the network layer 100. Instead, it operates within the context of an abstract second network, a so-called overlay network 112 running on top of network layer 100.

The overlay network 112 is organized according to peer-to-peer principles; with all participating computer systems fulfilling equivalent roles. It is implemented in one of several possible ways by extending algorithms previously developed for the implementation of storage in peer-to-peer overlay networks, such as are available under the names Chord/DHash, CAN, Pastry, Tapestry, and Kademlia. Some of the algorithms, such as Chord or CAN, provide a routing layer 102 that forms the basis for a storing layer 106 implemented using a further, separate storing algorithm such as DHash. In other algorithms, such as Pastry, Tapestry, or Kademlia, there is no distinct separation between the routing 102 and storing 106 layers, the corresponding functionality is provided in a combined routing and storing layer 104.

Figure 2:
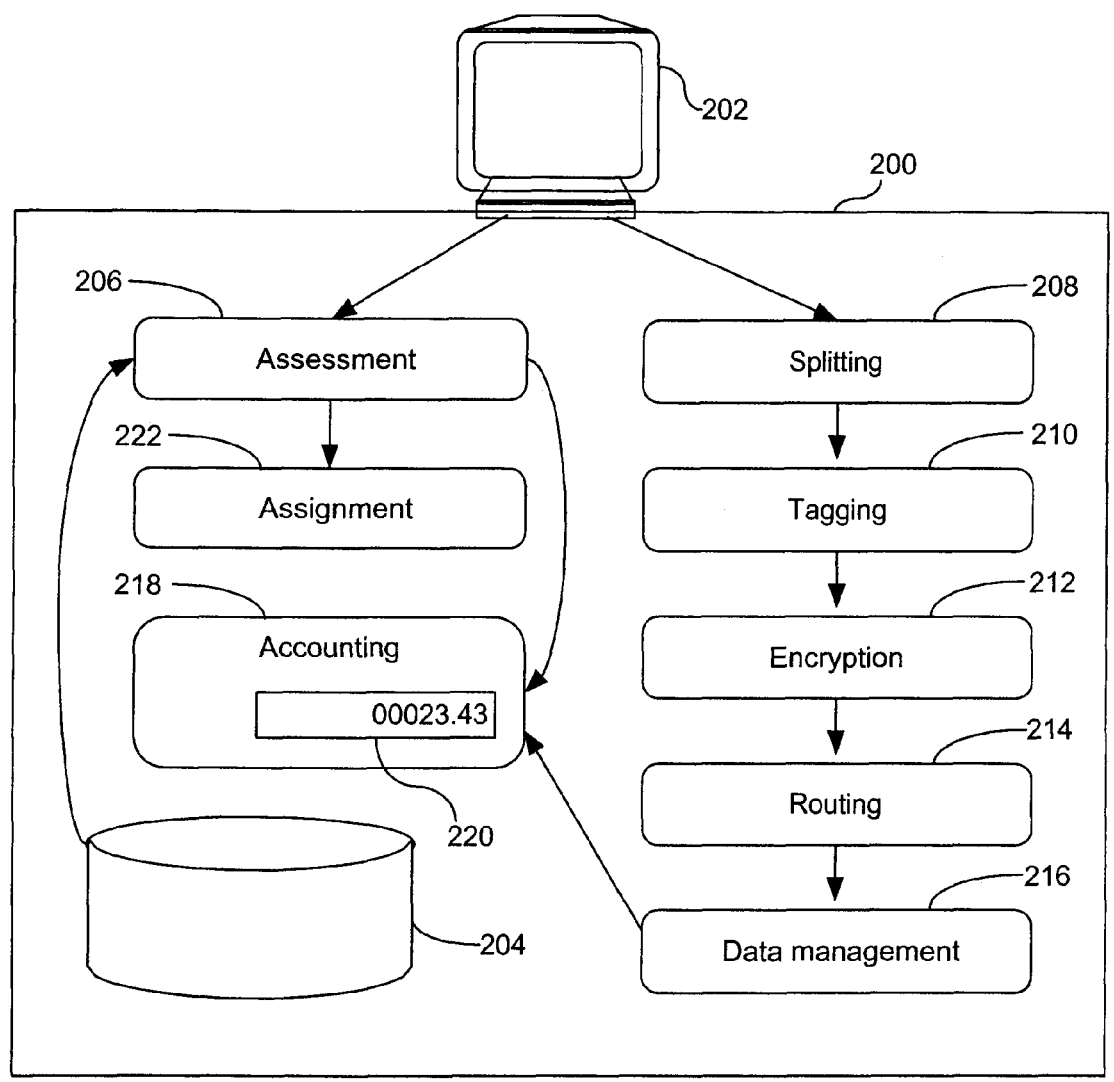
FIG. 2 is a block diagram of a user computer system of an embodiment of the invention.

FIG. 2 is a block diagram of a computer system 200 functioning as a peer in the peer-to-peer network described by FIG. 1. The computer system does not need to be a dedicated system and for example can be a personal computer, a server, or a storage system. On each participating computer system, peer software needs to be installed, which forms the technical basis for joining the peer-to-peer network.

The peer software comprises an assessment module 206 for evaluating the capabilities of the computer system 200 and calculates the service level at which the computer system 200 offers storage services to the peer-to-peer network. Among the capabilities evaluated are the overall capacity and free capacity of the storage resources 204, network bandwidth, and system uptime. Through a user interface 202 the user of the computer system 200 can influence the evaluation by restricting the resources to be contributed to the peer-to-peer network. For example, the user could decide to contribute only 10 GB of storage resources 204, although 40 GB may be available in the computer system. In operation, the assessment module 206 carries out the evaluation and informs the accounting module 218 of the evaluated service level. The accounting module maintains a current balance 220 of payment units that can be exchanged for storing data in the peer-to-peer network. From the service level evaluated by the assessment module, the accounting module 218 determines an initial amount of payment units to be allotted to the computer system and credits the amount to the current balance 220. The evaluation is repeated in regular intervals such as once daily and can be initiated by the user at any time through the user interface 202.

In order to initiate the storing of a data file in the peer-to-peer network the user of computer system 200 selects through user interface 202 the data file for storing, together with a desired service level at which the data file shall be stored. The splitting module 208 then splits the file in several data objects for further dispersal and storage. The number of data objects produced from the data file depends on the selected service level. The selected service level furthermore determines the degree of redundancy with which the data objects are produced, in other words, how many of the data objects will have to be retrieved successfully from the peer-to-peer network in order to restore the data file from them.

The data objects produced by the splitting module 208 are in a further step by tagging module 210 assigned unique data identifiers that reflect the desired service level, selected by the user for the storing of the data file from which the data objects were produced. Preferably, the tagging module 210 calculates the data identifier as concatenation of a hash value derived from the desired service level and a hash value derived from the binary data of the respective data objects.

An encryption module 212 encrypts the data objects using an encryption key that is known only to the user of computer system 200. The data objects are then routed through the peer-to-peer network by routing module 214, using a routing algorithm such as Chord, CAN or Tapestry. Because of the encryption, data objects cannot be compromised during storage on a replication computer system or during transfer through the network. Information about the data objects is transferred by routing module 214 to data management module 216, which manages all properties of the routed data objects, including tables of the data objects' respective data identifiers for retrieval. Once a data object has been routed to its storage destination at a replication computer system, the data management module of the replication computer system contacts the data management module 216 of computer system 200. The data management module 216 instructs accounting module 218 to deduct payment units according to the service level the data object has been stored at.

Figure 3:
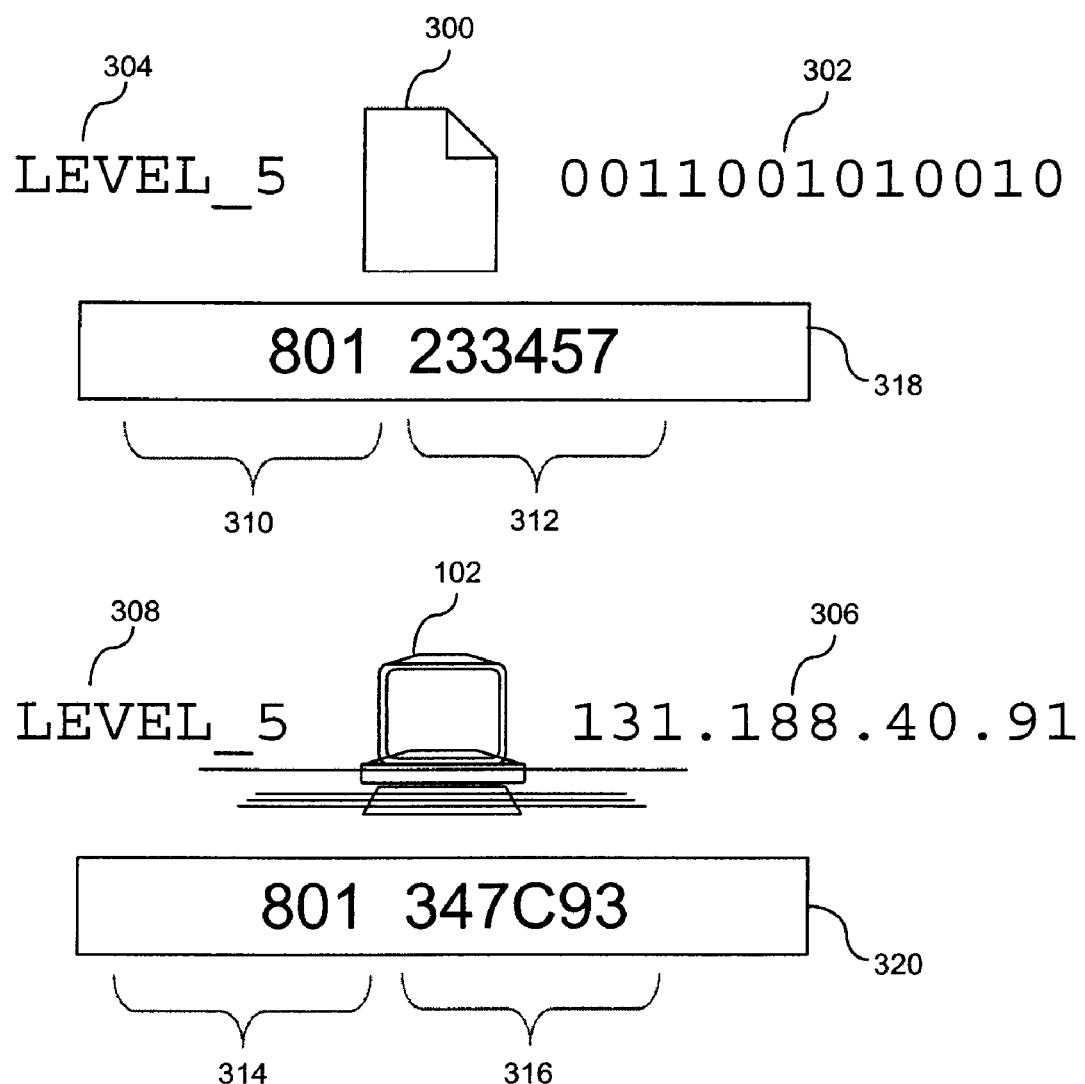
FIG. 3 is a diagram showing how data and peer identifiers are calculated.

FIG. 3 is a diagram showing the respective structure of data 318 and peer identifiers 320 used in the peer-to-peer network. Assignment of a peer identifier 320 to a computer system 102 is a prerequisite for the computer system's joining the peer-to-peer network. Before the peer identifier can be constructed and assigned, the capabilities of the computer system have to be evaluated and an offered service level 308 from a set of possible service levels has to be determined, according to which the computer system will be able to offer storage services in the peer-to-peer network. The offered service level 308 is represented as textual or binary data in a standardised way, the details of which are arbitrary but unified throughout the peer-to-peer network. The offered service level 308 shown as example only is represented as a string of characters "LEVEL_5". From the offered service level 308 expressed in the standardised way a hash value 314 is then calculated in an equally standardised way using a hash function such as the function provided by the SHA-1 algorithm. The details of the hash function are arbitrary but unified throughout the peer-to-peer network. The hash value 314 shown as example only has the value "801", calculated by operating the hash function on the string of characters "LEVEL_5" that represents the offered service level 308.

If the number of computer systems participating in the peer-to-peer network exceeds the number of elements of the set of service levels, a plurality of computer systems share the same offered service level 308 and hash value 314, which is derived from the offered service level 308 in a standardised way, yielding identical hash values 314 for identical offered service levels 308. By concatenating the hash value 314 with a further hash value 316 that is calculated from unique properties 306 of the computer system 102, a peer identifier 320 is constructed that is unique in the peer-to-peer network. Suitable choices for the unique properties 306 are hardware identifiers unique to the computer system 102, or network addresses such as IP addresses of the conventional network underlying the peer-to-peer overlay network. The choice of the unique properties, the way they are represented as binary or textual data, and the hash function used are arbitrary but unified throughout the peer-to-peer network.

Assignment of a data identifier 318 to a data object 300 is a prerequisite for routing the data object through the peer-to-peer network. Before the data identifier can be constructed and assigned, the desired service level 304 for the data object 300 from a set of possible service levels has to be determined, according to which the data object is intended to be stored in the peer-to-peer network. The desired service level 304 is represented as textual or binary data in a standardised way corresponding to the standardised way in which the offered service level 308 of a computer system 102 is expressed when calculating the peer identifier 320 of the computer system. The desired service level 304 shown as example only is represented as a string of characters "LEVEL_5". From the desired service level 304 expressed in the standardised way a hash value 310 is then calculated in the same standardised way in which the hash value 314 is calculated from the offered service level 308 of a computer system. The hash value 310 shown as example only has the value "801", calculated by operating the hash function on the string of characters "LEVEL_5" that represents the desired service level 304.

By concatenating the hash value 310 with a further hash value 318 that is calculated from binary data 302 unique to the data object 300, a data identifier 318 is constructed that is unique among the data objects stored in the peer-to-peer network. The choice of hash function and the way the hash value is calculated from the binary data 302 are arbitrary but unified throughout the peer-to-peer network.

Figure 4:
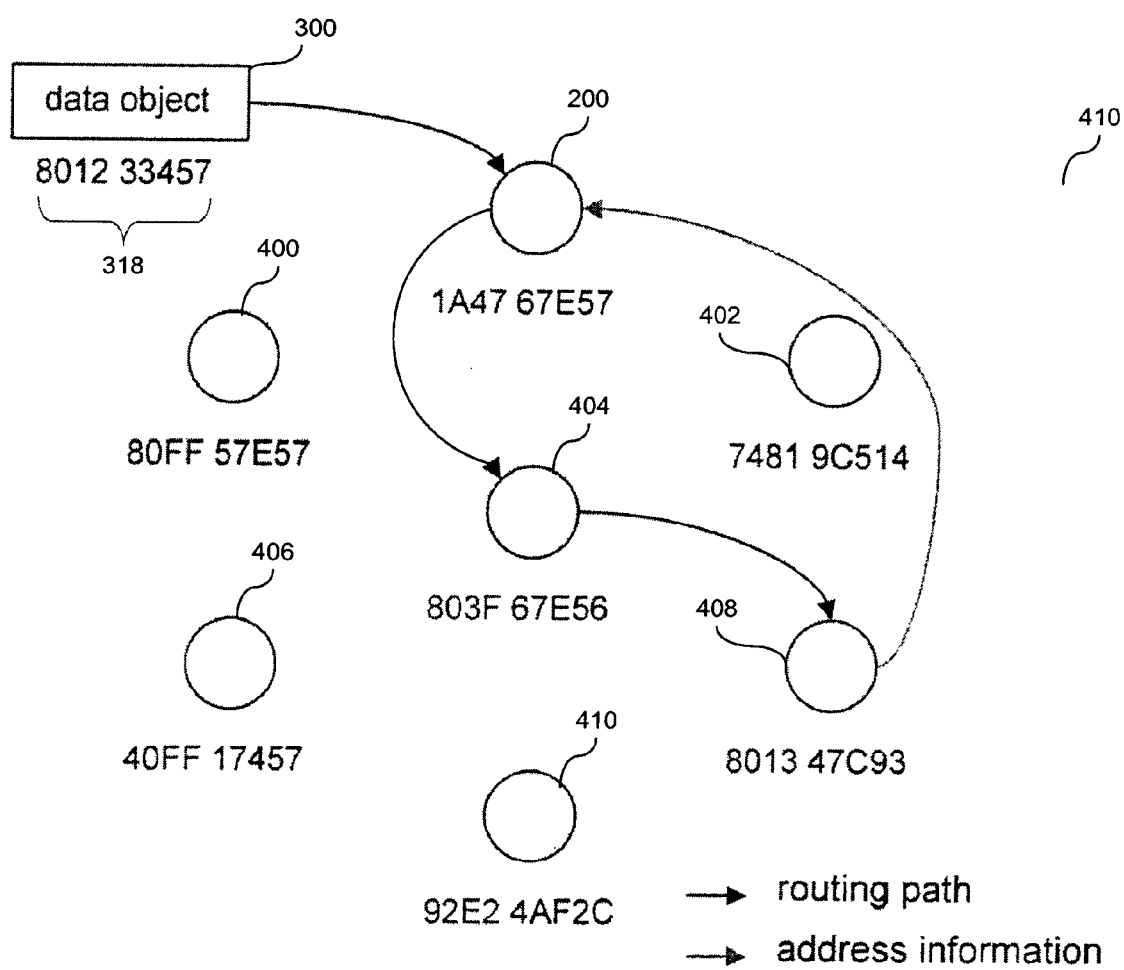
FIG. 4 is a map of a data object's routing path through the peer-to-peer network.

FIG. 4 shows a map of a peer-to-peer network of computer systems 200, 200', 200'', 200'''. Each of the computer systems is labelled with its respective peer identifier 320, 320', 320'', 320'''. The computer systems are symbolically arranged into a hexagonal grid, with the intended meaning that nearest neighbours in the symbolic hexagonal grid are nearest neighbours in the peer-to-peer network.

A data object 300 originating on computer system 200 and labelled with a data identifier 318 is routed through the peer-to-peer network along a routing path shown as solid arrows. The data identifier 318 of data object 300 is compared to the peer identifier 320 of computer system 200, and to the peer identifiers of the nearest neighbours 400, 402, and 404 of computer system 200. The peer identifier of computer system 404 is found to be closest to the data identifier 318 of data object 300, assuming a metric defined in the address space of the peer and data identifiers that compares identifiers bit-by-bit, starting with the most significant bit at the respective beginnings of the identifiers. The data object 300 is accordingly routed to computer system 404. On computer system 404, the data identifier 318 of data object 300 is compared to the peer identifiers of computer system 404 itself and of its nearest neighbours 200, 400, 402, 406, 410, and 408. According to the metric defined, the data identifier 318 is found to be closest to the data identifier of computer system 408.

Having been routed to computer system 408, the data identifier 318 of data object 300 is compared to the peer identifiers of computer system 408 itself and of its nearest neighbours 402, 404, and 410. Because the data identifier 318 is found to be closer to the peer identifier of computer system 408 than to any peer identifier of the nearest neighbours, it is stored on computer system 408 without being routed any further. Computer system 408 then passes information about the storage location of data object 300 directly to computer system 200, from where data object 300 originated.

LIST OF REFERECE NUMERALS

100 Network layer
102 Routing layer
104 Combined routing and storing layer
106 Storing layer
108 Service-level metric layer
110 Application layer
200 User computer system
202 User interface
204 Storage resources
206 Assessment module
208 Splitting module
210 Tagging module
212 Encryption module
214 Routing module
216 Data management module
218 Accounting module
220 Current balance of payment units
222 Assignment module
300 Data object
302 Binary data
304 Desired service level
306 Unique properties
308 Offered service level
310 Hash value of desired service level
312 Hash value of data object
314 Hash value of offered service level
316 Hash value of unique system properties
318 Data identifier
320 Peer identifier
400, 402, 404, 406 Peer computer systems
408 Replication computer system
410 Peer-to-peer network

The invention claimed is:

1. A method of storing a data file from a user computer system in a peer-to-peer network of computer systems, each computer system offering storage services at a respective offered service level of a set of service levels, the method comprising:
 assigning to each of the computer systems respective peer identifiers from a metric space in such a way that the distance between peer identifiers of computer systems offering storage at the same service level is smaller than between peer identifiers of computer systems offering storage at different service levels,
 selecting a desired service level of the set of service levels for storing the data file,
 producing one or more data objects from the data file,
 assigning to one of the data objects a data identifier from the metric space in such a way that the distance between the data identifier of the one of the data objects and any peer identifier of a computer system offering storage at the desired service level is smaller than the distance between the data identifier of the one of the data objects and any peer identifier of a computer system offering storage at a service level different from the desired service level,
 routing the one of the data objects through the peer-to-peer network to a replication computer system having a peer identifier that is closer to the data identifier of the one of the data objects than any peer identifier of another computer system connected to the replication computer system through peer-to-peer interactions, and
 storing the one of the data objects on the replication computer system.

2. The method of claim 1, further comprising encrypting the one of the data objects.

3. The method of claim 1, wherein the data identifier comprises a concatenation of a hash value derived from the desired service level and a hash value derived from the one of the data objects.

4. The method of claim 1, wherein for each of the computer systems the respective peer identifier comprises a concatenation of a hash value derived from the service level offered by the respective computer system and a hash value derived from unique properties of the respective computer system.

5. The method of claim 1, further comprising assessing the service level offered by each of the computer systems, the assessment being based on any of available disk space, overall disk space, uptime, and networking bandwidth of the respective computer system.

6. The method of claim 5, further comprising allotting payment units to each of the computer systems according to the service level offered by the respective computer system.

7. The method of claim 6, further comprising transferring payment units from the user computer system to the replication computer system in exchange for storing the one of the data objects.

8. The method of claim 6, wherein the payment units transferred depend on the service level selected for the data file.

9. The method of claim 1, further comprising:
 evaluating the actual service level at which the data object is stored on the replication computer system, and
 routing the data object to a further replication computer system if the actual service level does not match the desired service level.

10. The method of claim 1, wherein the number of data objects produced from the data file depends on the selected service level for the data file.

11. The method of claim 1, further comprising repeating the steps of assigning, routing, and storing for each of the one or more data objects, the one or more data objects being stored on one or more replication computer systems.

12. The method of claim 11, further comprising:
 retrieving a subset of the one or more data objects from a subset of the one or more replication computer systems, and
 restoring the data file using the subset of the one or more of the data objects.

13. The method of claim 12, wherein the number of data objects required for restoring the data file depends on the selected service level for the data file.

14. A user computer system for providing storage services in a peer-to-peer network of computer systems, comprising:
 storage devices,
 storage resources available for offering storage services to the peer-to-peer network,
 an assessment module for assessing the storage resources and deriving an offered service level of a set of service levels at which the storage services are provided,
 an assignment module for assigning to the user computer system a peer identifier from a metric space in such a way that the distance between the peer identifier and any further peer identifier of a further computer system offering storage at the same service level is smaller than the distance between the peer identifier and any further peer identifier of a further computer system offering storage at a different service level
 a user interface for selecting a desired service level of the set of service levels for storing a data file in the peer-to-peer network a splitting module for producing one or more data objects from the data file, a tagging module for assigning to one of the data objects a data identifier from the metric space in such a way that the distance between the data identifier of the one of the data objects and any peer identifier of a computer system offering storage at the desired service level is smaller than the distance between the data identifier of the one of the data objects and any peer identifier of a computer system offering storage at a service level different from the desired service level, and a routing module for routing the one of the data objects through the network to a replication computer system having a peer identifier that is closer to the data identifier of the one of the data objects than any peer identifier of another computer system connected to the replication computer system over the peer-to-peer network.

15. The user computer system of claim 14, the storage resources comprising any of available disk space, overall disk space, uptime, and networking bandwidth.

16. The user computer system of claim 14, the peer identifier comprising a concatenation of a hash value derived from the service level offered and a hash value derived from unique properties of the user computer system.

17. The user computer system of claim 14, further comprising:

a current balance of payment units, and an accounting module for allotting payment units to the computer system according to the service level offered by the user computer system as determined by the assessment module.

18. The user computer system of claim 14, further comprising a data management module for validating the actual service level at which the data object is stored on the replication computer system.

* * * * *